(12) United States Patent
Wang et al.

(10) Patent No.: US 10,911,338 B1
(45) Date of Patent: Feb. 2, 2021

(54) PACKET EVENT TRACKING

(71) Applicant: VMware, Inc., Palo Alto, CA (US)

(72) Inventors: Yong Wang, San Jose, CA (US);
Xinhua Hong, Campbell, CA (US); Jia Yu, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 6 days.

(21) Appl. No.: 16/520,331

(22) Filed: Jul. 23, 2019

(51) Int. Cl.
*H04L 12/26* (2006.01)
*H04L 29/06* (2006.01)

(52) U.S. Cl.
CPC .............. *H04L 43/08* (2013.01); *H04L 43/16* (2013.01); *H04L 63/0245* (2013.01); *H04L 69/22* (2013.01)

(58) Field of Classification Search
CPC ..... H04L 43/08; H04L 43/16; H04L 63/0245; H04L 69/22
See application file for complete search history.

(56) References Cited

U.S. PATENT DOCUMENTS

| | | | |
|---|---|---|---|
| 2016/0357957 A1* | 12/2016 | Deen | H04L 41/046 |
| 2017/0142020 A1* | 5/2017 | Sundararaman | H04L 43/16 |
| 2020/0195534 A1* | 6/2020 | Monetti | H04L 67/1097 |

\* cited by examiner

*Primary Examiner* — Wing F Chan
*Assistant Examiner* — Billy H Ng
(74) *Attorney, Agent, or Firm* — Su IP Consulting

(57) ABSTRACT

Example methods and systems are provided for packet event tracking. One example method may comprise: in response to a logical forwarding element detecting a packet event for a first packet, determining a first packet signature of the first packet; and tracking the packet event by updating a set membership filter based on the first packet signature to indicate that the first packet is a member of a set associated with the packet event. The method may also comprise: in response to receiving a query as to whether the packet event has been detected and tracked for a second packet, determining a second packet signature of the second packet. Based on the second packet signature, the set membership filter may be applied to determine whether the second packet is a possible member of the set associated with the packet event.

21 Claims, 8 Drawing Sheets

PACKET EVENT TRACKING

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, various network issues may affect data-plane connectivity among hosts and VMs. It is desirable to troubleshoot such network issues, such as where a particular issue occurs.

DETAILED DESCRIPTION

Figure 1:
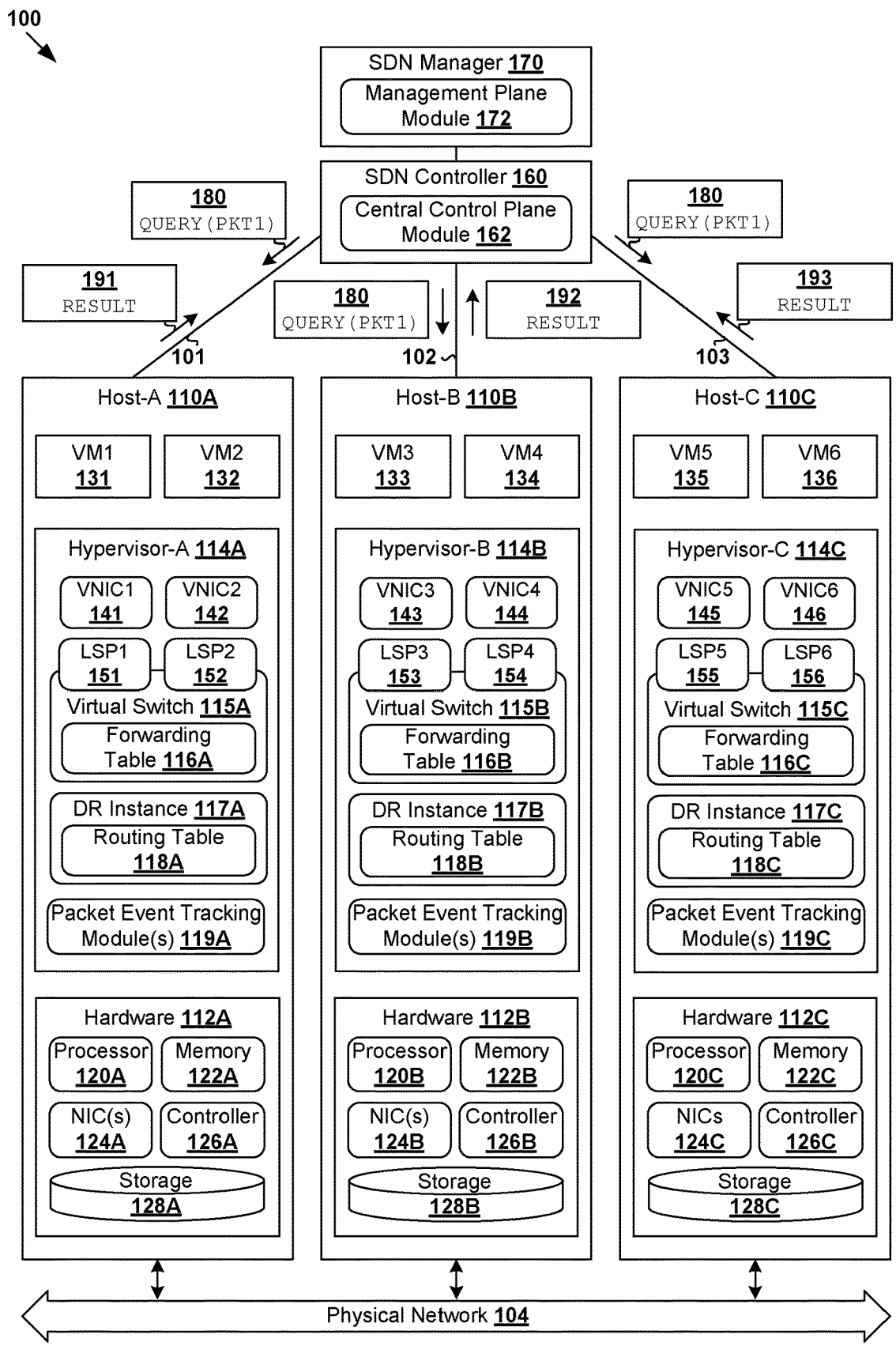
FIG. 1 is a schematic diagram illustrating an example software-defined networking (SDN) environment in which packet event tracking may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network troubleshooting will now be explained in more detail using FIG. 1, which is a schematic diagram illustrating example software-defined networking (SDN) environment 100 in which packet event tracking may be performed. It should be understood that, depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (also known as a "host computers", "host devices", "physical servers", "server systems", "transport nodes," etc.), where each host may be supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM4 134; host-B 110B supports VMs 132-133; and host-C 110C supports VMs 135-136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hosts 110A-C maintains data-plane connectivity with each other via physical network 104 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A). Hypervisor-B 114B implements a second VTEP with (IP-B, MAC-B), and hypervisor-C 114C a third VTEP with (IP-C, MAC-C). Encapsulated packets may be sent via a tunnel established between a pair of VTEPs over physical network 104, over which respective hosts are in layer-3 connectivity with one another. Each host 110A/110B/110C may implement local control plane (LCP) agent (not shown) to interact with network management entities such as SDN manager 170 and SDN controller 160. For example, control-plane channel 101/102/103 may be established between SDN controller 160 and host 110A/110B/110C using TCP over Secure Sockets Layer (SSL), etc. Management entity 160/170 may be implemented using physical machine(s), virtual machine(s), a combination thereof, etc.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts.

Figure 2:
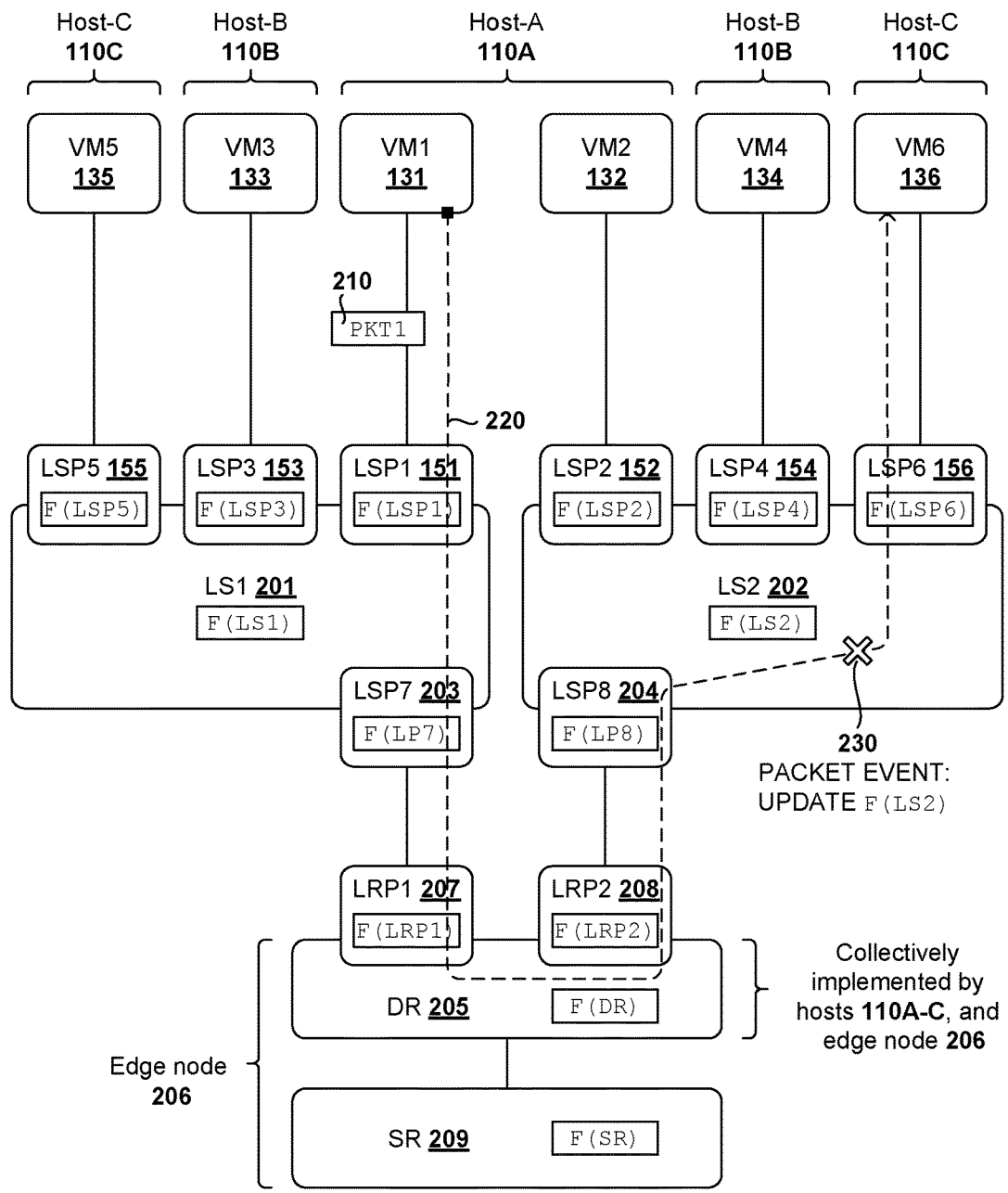
FIG. 2 is a schematic diagram illustrating an example management plane view of the SDN environment in FIG. 1.

Some examples are shown in FIG. 2, which is a schematic diagram illustrating example management plane view 200 of SDN environment 100 in FIG. 1. In FIG. 2, VM1 131, VM3 133 and VM5 135 are located on a first logical layer-2 segment and connected to a first logical switch (see "LS1" 201). VM2 132, VM4 134 and VM6 136 are located on a second logical layer-2 segment and connected to a second logical switch (see "LS2" 202). A logical DR (see "DR" 205) connects logical switches 201-202 with each other to facilitate communication among VMs 131-136 on different segments. See also logical switch ports "LSP7" 203 and "LSP8" 204, and logical router ports "LRP1" 207 and "LRP2" 208 connecting DR 205 with logical switches 201-202. As discussed using FIG. 1, logical switch 201/202 may be implemented collectively by multiple transport nodes, such as using virtual switches 115A-C and represented internally using forwarding tables 116A-C. DR 205 may be implemented collectively by multiple transport nodes, such as using edge node 206 and hosts 110A-C. For example, DR 205 may be implemented using DR instances 117A-C and represented internally using routing tables 118A-C at respective hosts 110A-C.

Edge node 206 may implement one or more logical DRs and logical service routers (SRs), such as DR 205 and SR 209 in FIG. 2. SR 209 may represent a centralized routing component that provides centralized stateful services to VMs 131-136, such as IP address assignment using dynamic host configuration protocol (DHCP), load balancing, network address translation (NAT), etc. Edge node 206 may be deployed at the edge of a geographical site to facilitate north-south traffic to an external network at a different geographical site. Although not shown in FIG. 2, a multi-tier topology may be used to isolate multiple tenants. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). In this case, a logical router may be categorized as one of the following types: TLR-DR, TLR-SR, PLR-DR and PLR-SR. Depending on the desired implementation, DR 205 and SR 209 may be connected via a transit logical switch (not shown in FIG. 2 for simplicity).

In practice, there may be hundreds or thousands of logical routers and logical switches, as well as tens of thousands of logical switch ports. At a particular instance during runtime, there might be a large number of packets travelling between different endpoints to facilitate various applications. In some cases, packets might be dropped at various locations in a logical network due to various reasons. For network troubleshooting purposes, it is desirable to be able to identify where exactly a specific event (e.g., packet loss) has occurred. However, as the scale and complexity of SDN environment 100 increases, network troubleshooting may be increasingly challenging.

Packet Event Tracking

According to examples of the present disclosure, logical forwarding element(s) may be configured to perform packet event tracking based on packet signatures to facilitate network diagnosis and troubleshooting. For example, in the case of packet loss, a set membership filter may be updated to track packets dropped by a particular logical forwarding element. By tracking such packet events, the set membership filter may be used to determine whether a specific packet has been dropped by the logical forwarding element. As used herein, the term "logical forwarding element" may refer generally to a logical entity that is deployed on a datapath to connect a pair of endpoints (e.g., VM1 131 and VM6 136), such as a logical switch port, logical switch, logical router port, logical DR, logical SR, edge node, VNIC, etc.

Figure 3:
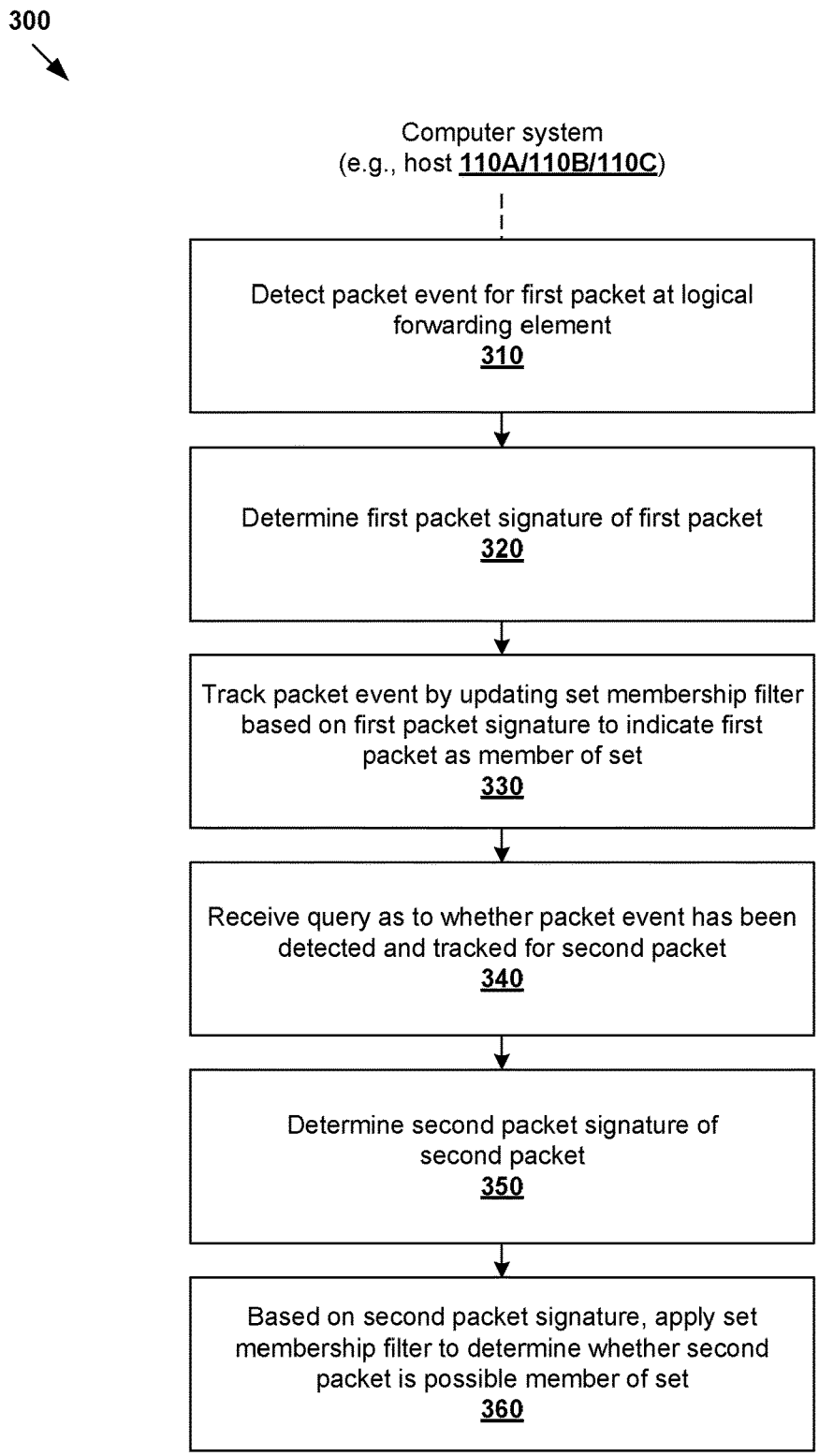
FIG. 3 is a flowchart of an example process for a computer system supporting a logical forwarding element to perform packet event tracking in an SDN environment.

In more detail, FIG. 3 is a flowchart of example process 300 for a computer system to perform packet event tracking in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. In practice, example process 300 may be implemented by any suitable "computer system," such as physical host 110A/110B/110C (e.g., using packet event tracking module 119A/119B/119C) supporting a particular logical forwarding element, edge node (e.g., VM or bare metal machine), etc.

At 310, 320 and 330 in FIG. 3, in response to detecting a packet event for a first packet, the packet event may be tracked by updating a set membership filter based on a first packet signature associated with the first packet. Using the example in FIG. 2, a first packet (see "PKT1" 210) may be travelling from source VM1 131 towards destination VM6 136 along a datapath (see 220) via the following logical forwarding elements: LSP1 151 (connected to VM1 131), LS1 201, LSP7 203, LRP1 207, DR 205, LPR2 208, LSP8 204, LS2 202, and LSP6 156 (connected to VM6 136).

Depending on the desired implementation, any suitable number of logical forwarding elements may be configured to perform packet event tracking using a set membership filter denoted as F(x), where x identifies a particular logical forwarding element. For example, a filter denoted as F(LSP1) may be used for packet event tracking at LSP1 151; F(LS1) at LS1 201; F(LSP7) at LSP7 203; F(LRP1) at LRP1 207; F(DR) at DR 205; F(LRP2) at LPR2 208; F(LSP8) at LSP8 204; F(LS2) at LS2 202; and F(LSP6) at LSP6 156. In the example in FIG. 2, in response to detecting packet event 230 for "PKT1" 210, LS2 202 may update set membership filter F(LS2). As used herein, the term "packet event" may refer generally to a trackable incident or phenomenon associated with packet(s). Any suitable "packet event" may be tracked, such as packet loss events (see FIGS. 5-6), and performance-related events (see FIGS. 7-8). At a particular logical forwarding element, multiple set membership filters may be used to track different packet events.

At 340, 350 and 360 in FIG. 3, in response to receiving a query as to whether the packet event has been detected and tracked by the logical forwarding element for a second packet, the set membership filter may be applied to determine whether the second packet is a possible member of the set associated with the packet event based on a second packet signature. This way, a particular logical forwarding element may respond to a management entity (e.g., SDN manager 170) with a positive response (i.e., result=YES) to indicate that the second packet is a possible member, or otherwise (i.e., result=NO). See example query 180 and responses 191-193 in FIG. 1.

Note that the term "first packet" at blocks 310-330 may refer generally to a packet based on which a set membership filter is updated during a packet event tracking phase. The term "second packet" at blocks 340-360 may refer generally to a packet specified by the query and to which the set membership filter is applied during a query handling phase. The second packet may have the same packet signature as the "first packet" at blocks 310-330, or a different packet signature.

As used herein, the term "set membership filter" or "set membership data structure" may refer to any suitable probabilistic approach for tracking and testing set membership. One example of a set membership filter is a Bloom filter, which is an approximate set membership filter that includes k hash functions and an array with m elements. Bloom filters are generally space-efficient in that a fixed-sized Bloom filter may be used to represent a set with an arbitrarily large number of packet events. As will be described using FIGS. 4-8, block 330 may involve updating the set membership filter by applying k hash functions on the first packet signature to map the first packet signature onto k elements of an array with m elements. In this case, block 360 may involve applying the k hash functions on the second packet signature to map the second packet signature onto k elements of the array with m elements. Based on the k elements, the second packet may be determined to be a possible member of the set of associated with the packet event, or otherwise.

According to examples of the present disclosure, packet events may be tracked by various logical forwarding elements in a distributed manner. The packet event tracking approach in the present disclosure should be contrasted against conventional approaches that rely on statistics collections, such as the aggregated number of packets received, transmitted or dropped at a particular location of a logical network. Such statistics-based approaches may lack accuracy, especially in a large-scale network environment with hundreds of transport nodes or hosts. Although the statistics may provide some numerical insights, it is generally difficult to correlate the statistics with specific packets of interest to examine where, for example, the packets were dropped. Various examples will be explained using FIGS. 4 to 8 below.

Packet Loss Events

Figure 4:
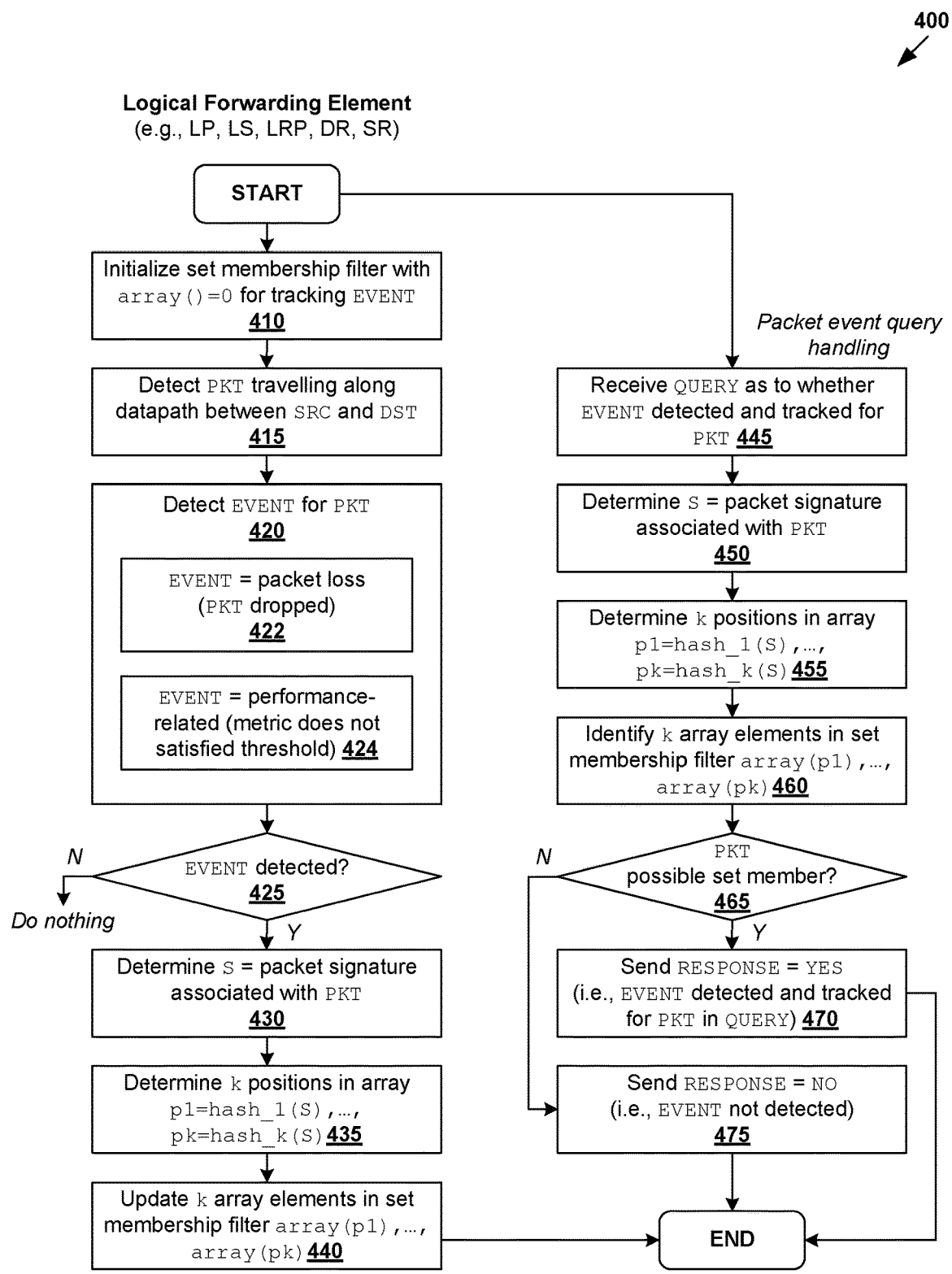
FIG. 4 is a flowchart of an example detailed process for packet event tracking in an SDN environment.

FIG. 4 is a flowchart of example detailed process 400 for packet event tracking in SDN environment 100. Example process 400 may include one or more operations, functions, or actions illustrated at 410 to 475. The various operations, functions or actions may be combined into fewer blocks, divided into additional blocks, and/or eliminated depending on the desired implementation. Example process 400 may be implemented by any suitable "computer system" supporting a logical forwarding element, such as LSP 151-156, LS 201-202, DR 205, SR 209, etc. Each logical forwarding element may be supported by one or multiple hosts 110A-C using respective hypervisors 114A-C.

(a) Set Membership Filter

The example in FIG. 4 will be explained using FIG. 5, which is a schematic diagram illustrating example packet event tracking 500 relating to packet loss in SDN environment 100. In the following, a "set membership filter" will be exemplified using a Bloom filter with a Boolean array. In practice, it should be understood that any alternative and/or additional set membership filter(s) may be used. Example variants may include counting Bloom filter, compressed Bloom filter, spectral Bloom filter, weighted Bloom filter, independently scalable Bloom filter, incremental Bloom filter, restricted fill Bloom filter, adaptive Bloom filter, etc.

Figure 5:
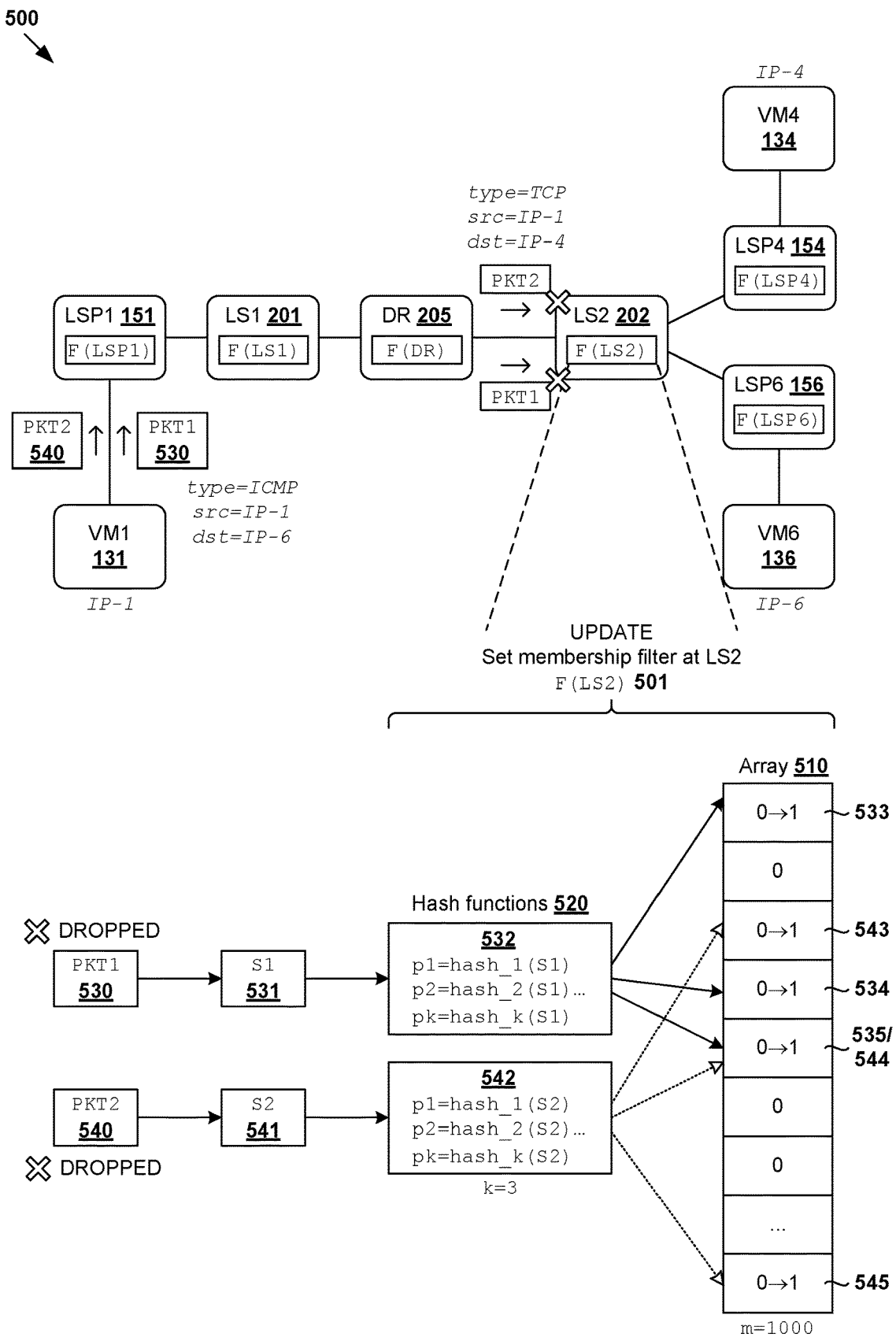
FIG. 5 is a schematic diagram illustrating an example packet event tracking relating to packet loss in an SDN environment.

In the example in FIG. 5, consider two example "first packets" that are dropped at a logical forwarding element. One packet (see "PKT1" 530) may be an Internet Control Message Protocol (ICMP) packet that is addressed from source VM1 131 with IP address=IP-1 to destination VM6 136 with IP address=IP-6. Another packet (see "PKT2" 540) may be a TCP packet addressed from source VM1 131 to destination VM4 134 with IP address=IP-4. In both cases, packet 530/540 travels along a datapath on which the following are located: LSP1 151, LS1 201, DR 205, and LS2 202 where packet 530/540 is dropped. For simplicity, some logical forwarding elements in FIG. 2 are not shown in FIG. 5.

At 410 in FIG. 4, a set membership filter (e.g., Bloom filter) for tracking packet loss events may be initialized at each logical forwarding element. In the example in FIG. 5, Bloom filter 501 denoted as F(LS2) may be initialized at LS2 201. Bloom filter 501 includes an array of m elements (see 510) and k hash functions (see 520) to store all packets dropped by a particular logical forwarding element. Each array element is a Boolean value that is initialized to zero. Hash functions hash_1( ), hash_2( ), . . . , hash_k( ) are each configured to map an input (e.g., packet signature) to a value within the range of {0, . . . , m−1}. Since a logical forwarding element (e.g., F(LS2)) may be collectively implemented by multiple hosts 110A-C, each host may maintain a local version of F(LS2) to facilitate packet event tracking. Alternatively or additionally, hosts 110A-C may delegate filter management tasks to another entity.

At 415, 420, 425 and 430 in FIG. 4, in response to detecting a packet loss event (i.e., decision to drop a packet at 422), a packet signature associated with the dropped packet may be determined (e.g., using calculation(s) or other operation(s)). In the example in FIG. 5, one packet signature (see "S1" 531) may be determined for "PKT1" 530, and another packet signature (see "S2" 532) for "PKT2" 540. Here, the term "packet signature" may refer generally to any suitable information that may identify a packet, such as header information and/or payload information, a transformation thereof (e.g., by applying a function, operation, or the like), etc.

In one example, block 430 may involve applying a mask on packet 530/540 to extract invariant content from packet 530/540. In practice, the first 24 invariant bytes of a packet (e.g., 20-byte IP header with 4 bytes masked out, plus the first eight bytes of the payload) may be used to differentiate non-identical packets. Alternatively or additionally, block 430 may involve extracting a set of tuples from packet 530/540, such as source IP address, source MAC address, source port number, destination IP address, destination MAC address, destination port number, protocol, or any combination thereof.

Note that some packets may be modified during the forwarding process, such as by updating a time-to-live (TTL) field, checksum, etc. IP packets may also be transformed by intermediate routers (e.g., tunnels, etc.). If packet 530/540 encapsulated with an outer header (e.g., GENEVE header), packet signature 531/541 may be determined based on its inner packet after decapsulation (i.e., GENEVE header removed). For encrypted packets (e.g., Encapsulating Security Payload (ESP) packets), any suitable cryptographic information available at a logical forwarding element (e.g., edge node 206 in FIG. 2) may be leveraged for packet decryption prior to determining the packet signature.

At 435 and 440, set membership filter 501 may be updated by applying k hash functions 520 on packet signature 531/541 to map packet signature 531/541 onto k out of m elements of array 510. In particular, array 510 is updated at indices or positions selected using k hash functions. For packet signature "S1" 531, the positions selected using k=3 hash functions are denoted as p1=hash_1(S1), p2=hash_2(S1) and p3=hash_3(S1). The array elements located at those positions are: array(p1=0), array(p2=3) and array(p3=4). See 532-535 in FIG. 5. These array elements may be updated from zero (initial value) to one. This way, the packet loss event of "PKT1" 530 may be tracked using set membership filter 501.

Set membership filter 501 maintained by logical forwarding element=LS2 201 is further updated to track the packet loss event of "PKT2" 540. Based on packet signature "S2" 541, the positions selected using k=3 hash functions are denoted as p1=hash_1(S2), p2=hash_2(S2) and p3=hash_3 (S2). The corresponding array elements may be updated as follows: array(p1=2)=1 at 543, array(p2=4)=1 at 544 and array(p3=m−1)=1 at 545. This way, the packet loss event for "PKT2" 540 may be tracked. As shown in FIG. 5, it is possible for different packet signatures such as "S1" 531 and "S2" 541 to be mapped to a particular array element (see 535/544).

(b) Query Handling

Figure 6:
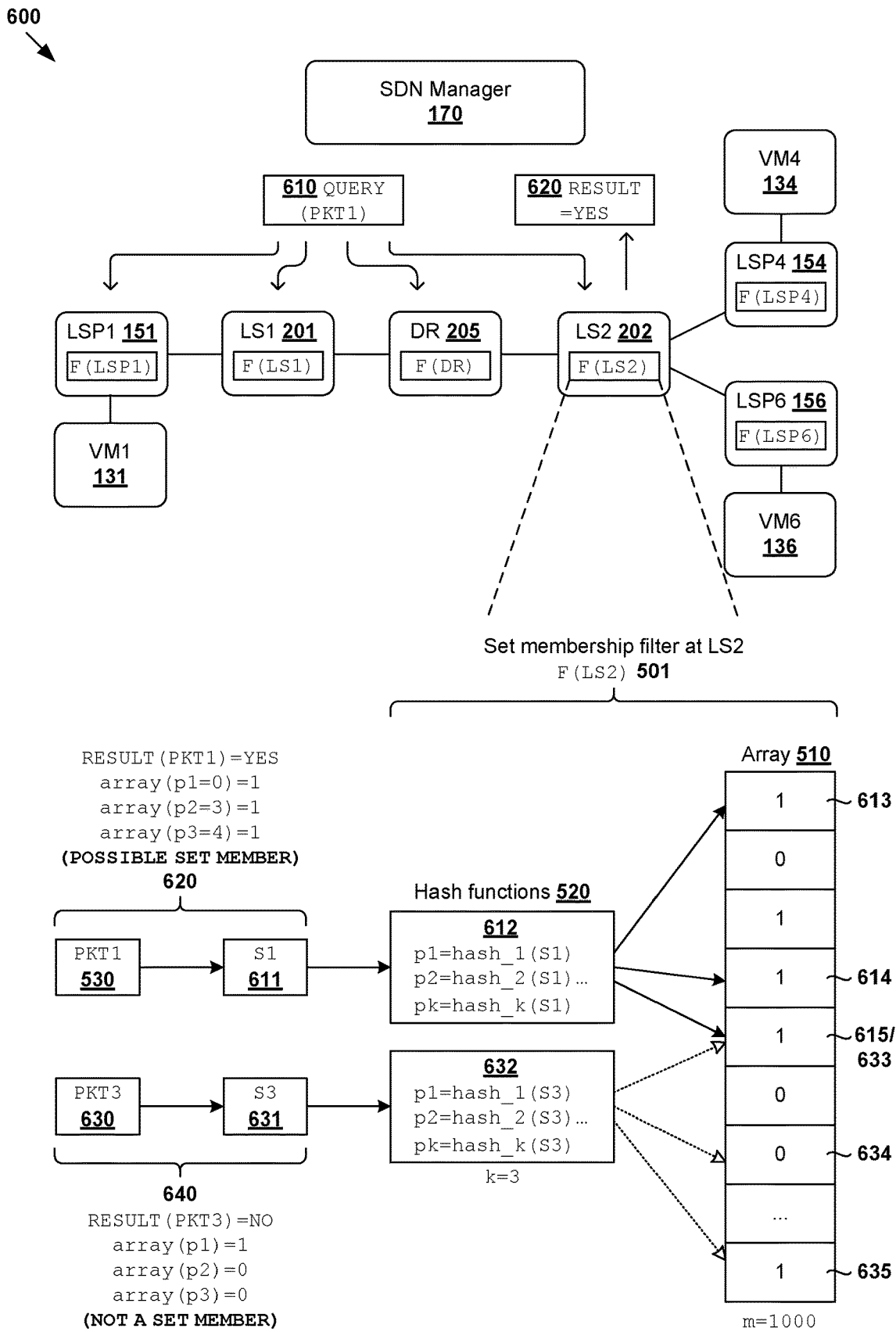
FIG. 6 is a schematic diagram illustrating an example query handling relating to packet loss in an SDN environment.

FIG. 6 is a schematic diagram illustrating example query handling 600 relating to packet loss in SDN environment 100. In this example, SDN manager 170 may receive a user's request to troubleshoot a network issue affecting the communication between VM1 131 and VM6 136. The user's request is to pinpoint where exactly a particular packet (e.g., "PKT1" 530) was dropped. SDN manager 170 may receive the user's request via any suitable interface, such as graphical user interface (GUI), command-line interface (CLI), application programming interface (API) calls, etc. In response to receiving the user's request, SDN manager 170 may generate and send a query (see 610 in FIG. 6) to various logical forwarding elements, such as LSP1 151, LS1 201, DR 205, LS2 202, LSP6 156, etc. Since a particular logical forwarding element may be implemented using multiple transport nodes, the query may identify a particular transport node, such as query(LS2, host ID=host-A), query(LS2, host ID=host-C), etc.

Using LS2 202 as an example, query 610 may be handled by applying set membership filter 501 according to blocks 445, 450, 455 and 460 in FIG. 4. In particular, in response to receiving query 610 as to whether a packet loss event is detected for "PKT1" 530, LS2 202 may determine packet signature "S1" 611 that is mapped to k=3 array elements in array 510. The positions selected using hash functions 612 are denoted as p1=hash_1(S1), p2=hash_2(S1) and p3=hash_3(S1). The corresponding array elements are: array(p1=0)=1 at 613, array(p2=3)=1 at 614 and array(p3=4)=1 at 615. Note that hash functions 520 in FIG. 6 are the same as those used for updating the same filter in FIG. 5.

At 465 and 470 in FIG. 4, "PKT1" 530 may be determined to be a possible member of a set of packets dropped by LS2

202 because each mapped array element has a value of one, i.e., array(p1)=1, . . . , array(pk)=1. As shown at 620 in FIG. 6, LS2 202 may generate and send a positive response (i.e., result=YES), thereby indicating that "PKT1" 530 might have been dropped at LS2 202. Otherwise, a negative response (i.e., result=NO) is sent at block 475.

Although not shown in FIG. 6, packet event tracking may be performed in a distributed manner by other logical forwarding elements (e.g., LSP1 151, LS1 201, DR 205, LSP6 156). During network diagnosis and troubleshooting, each logical forwarding element may handle query 610 according to blocks 445-475. This way, SDN manager 170 may receive and aggregate the following responses: result=NO from LSP1 151; result=NO from LS1 201; result=NO from DR 205, result=YES from LS2 202; and result=NO from LSP6 156. This indicates that it is possible that "PKT1" 530 with signature "S1" 531/611 has been dropped by LS2 202, thereby allowing SDN manager 170 and a user (e.g., network administrator) to pinpoint where exactly the packet has been dropped.

In another example in FIG. 6, LS2 202 may generate and send a negative response (i.e., result=NO) to SDN manager 170 in response to a query as to whether a packet loss event has been detected and tracked for "PKT3" 630. Based on signature "S3" 631, set membership filter 501 may be applied to determine whether "PKT3" 630 is a possible member of a set of packets dropped by LS2 202. This may involve applying hash functions 520 to select array positions: p1=hash_1(S3), p2=hash_2(S3) and p3=hash_3(S3); see 632. The array elements at the respective positions are: array(p1)=1 at 633, array(p2)=0 at 634 and array(p3)=0 at 635. Since not all mapped array elements have the value of one (see 634-635), "PKT3" 630 is not a member of the set. In other words, a packet loss event has not been detected and tracked for "PKT3" 630 at LS2 202. A negative response (i.e., result(PKT3)=NO) may be sent to SDN manager 170. See 640 in FIG. 6.

According to examples of the present disclosure, packet events may be tracked using set membership filter 501 in a space-efficient manner. Using a Bloom filter with a Boolean array, m array elements may be implemented using m bits. This should be contrasted against the use of a regular hash table that stores the entire packet signature. For example, on a system with 5000 logical routers and 5000 logical switches, each hash table may have to track up to 10,000 packet loss events, approximately 3 GB memory would be required (i.e., 28 bytes*10,000*10,000).

In practice, the performance of a set membership filter may be measured using a rate of false positives. For a Bloom filter, the rate of false positive (f) may be calculated as follows based on n=number of events detected, m=size of couting array 410 and k=number of hash functions:

$$f = \left(1 - e^{-\frac{kn}{m}}\right)^k$$

In general, there is usually a tradeoff between space efficiency for storing array 510 with m elements, and the rate of false positives. Depending on the desired implementation, f may be optimized within an acceptable range (e.g., around 0.001-0.01) by adjusting n, m and k. The querying process may also be optimized using any suitable approach, such as minimizing the number of queries sent by SDN manager 170 by excluding different logical forwarding elements whose packet event rate (e.g., packet loss) is lower than a predetermined threshold, etc.

Performance-Related Events

Figure 7:
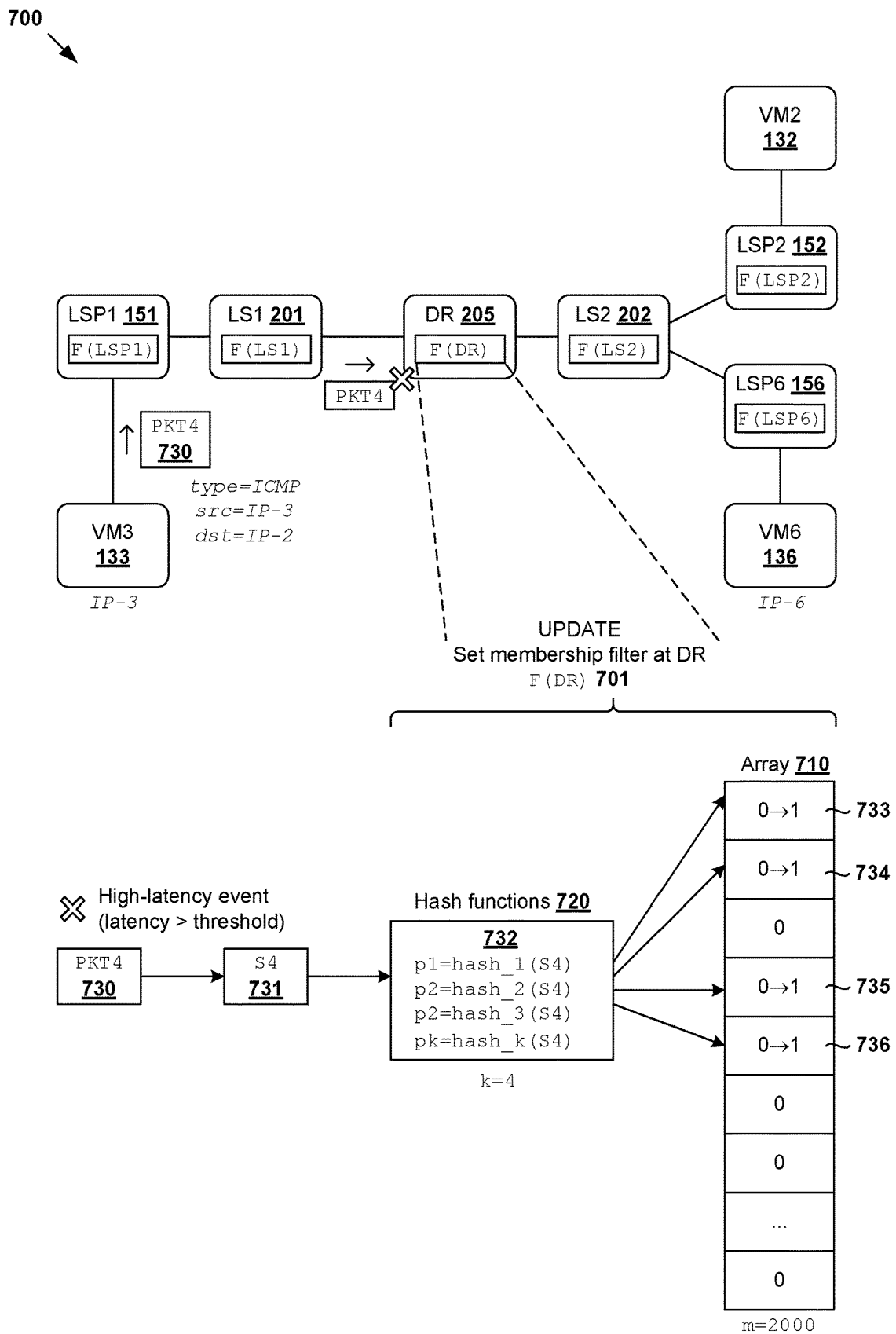
FIG. 7 is a schematic diagram illustrating an example packet event tracking relating to a performance metric in an SDN environment.
Figure 8:
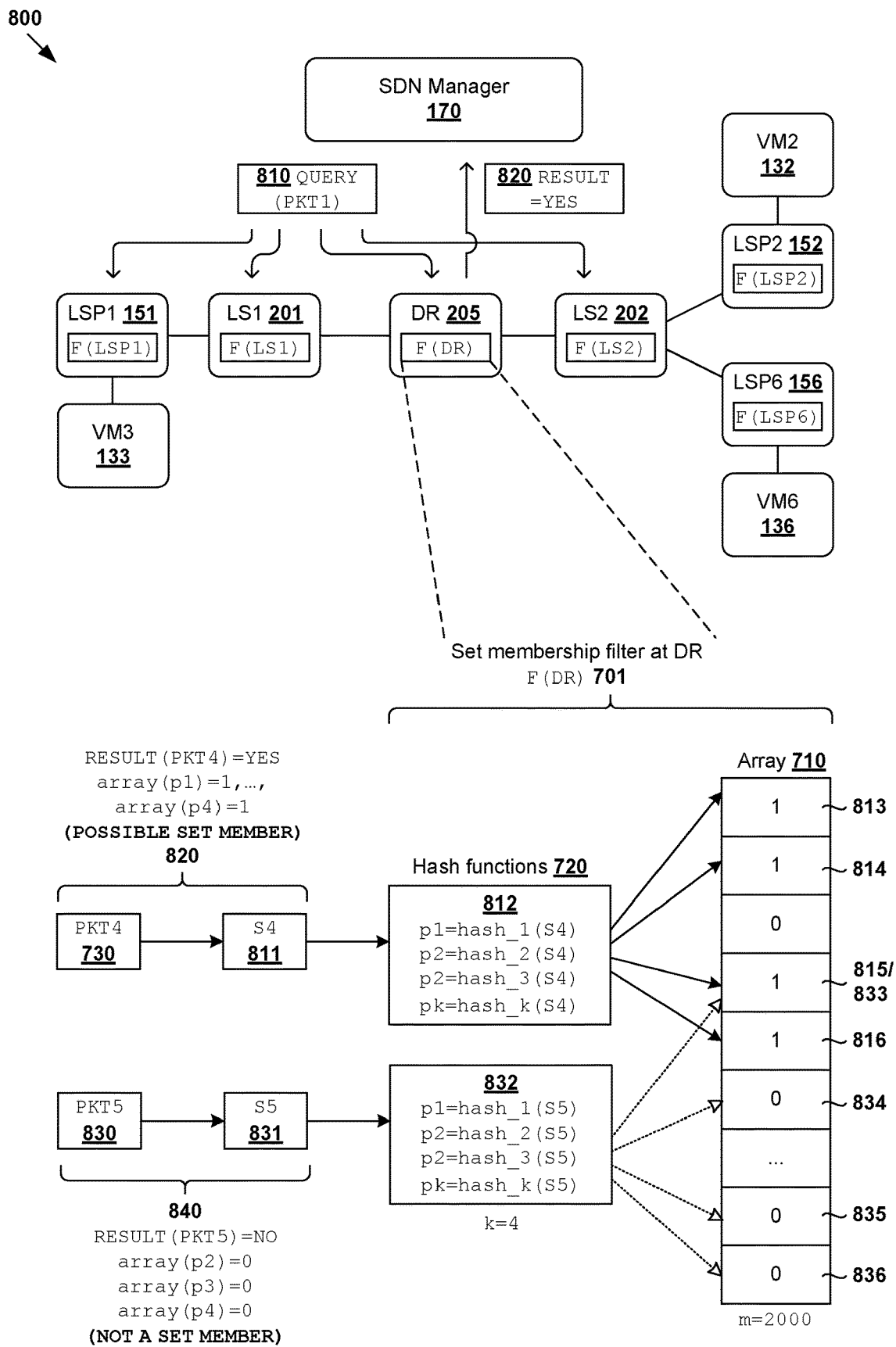
FIG. 8 is a schematic diagram illustrating an example query handling relating to a performance metric in an SDN environment.

According to examples of the present disclosure, performance-related events may be detected and tracked, such as when a performance metric exceeds a predetermined threshold according to block 424 in FIG. 4. Some examples will be explained using FIG. 7 and FIG. 8. FIG. 7 is a schematic diagram illustrating example packet event tracking 700 relating to a performance metric in SDN environment 100. FIG. 8 is a schematic diagram illustrating example query handling 800 relating to a performance metric in SDN environment 100. The term "performance metric" may refer generally to any suitable value measurable by a logical forwarding element, such as latency, throughput, packet size, jitter, any combination thereof, etc.

(a) High-Latency Event Tracking

In the example in FIG. 7, high-latency events may be tracked at a particular logical forwarding element (e.g., DR 205) using set membership filter 701 denoted as F(DR). For example, a "high-latency" event may be detected when the (local) latency of a particular packet exceeds a predetermined latency threshold (e.g., 20 ms). Similar to the example in FIG. 5, set membership filter 701 may include array 710 with m boolean values and k hash functions 720. In response to detecting a high-latency event for packet="PKT4" 730 addressed from VM3 133 to VM2 132, hash functions 720 may be applied to packet signature="S4" 731. The positions selected using k=4 hash functions are: p1=hash_1(S4), p2=hash_2(S4), p3=hash_3(S4) and p4=hash_4(S4). Next, the corresponding array elements are updated as follows: array(p1)=1, . . . , array(p4)=1. See 732-736 in FIG. 7. This way, the packet loss event of "PKT4" 730 may be tracked using set membership filter 701.

(b) Query Handling

In the example in FIG. 8, in response to receiving a query (see 810) as to whether a high-latency event has been detected and tracked for "PKT4" 830, DR 205 may respond with result=YES (see 820) according to blocks 445-470. Using set membership filter 701, packet signature "S4" 811 may be mapped to non-zero array elements array(p1)=1, . . . , array(p4)=1 by applying the hash functions. See 812-816 in FIG. 8. In other words, "PKT4" 730 is possibly a member of a set of high-latency packets tracked by DR 205.

In contrast, in response to receiving a query as to whether a high-latency event has been detected and tracked for "PKT5" 830, DR 205 may respond with result=NO (see 840) according to blocks 445-460 and 470. Using set membership filter 701, packet signature "S5" 831 is mapped to at least one zero-valued array element, such as array(p2)=0, array(p3)=0 and array(p4)=0. See also 832-836 in FIG. 8. In other words, "PKT5" 830 is determined not to be a member of a set of high-latency packets tracked by DR 205.

In practice, performance-related events may be tracked by different logical forwarding elements in a distributed manner. SDN manager 170 may collect responses (i.e., query result=YES or NO) from various logical forwarding elements to identify high-latency events along a datapath. Unlike the packet loss tracking example in FIGS. 5-6, multiple logical forwarding elements may detect that the latency of a packet exceeds a predetermined threshold, such as at both DR 205 and LS2 202. In this case, a user (e.g., network administrator) may pinpoint where exactly the high latency is detected in a more efficient manner. Some implementation details explained using FIGS. 5-6 are also applicable here and will not be repeated here for brevity.

Container Implementation

Although explained using VMs 131-136, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, the instructions or program code, when executed by the processor of the computer system, may cause the processor to perform packet event tracking according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform packet event tracking, wherein the method comprises:
   in response to detecting, by a logical forwarding element supported by the computer system, a packet event for a first packet travelling between a source and a destination via the logical forwarding element,
   determining a first packet signature of the first packet; and
   tracking the packet event by updating a set membership filter based on the first packet signature to indicate that the first packet is a member of a set associated with the packet event; and
   in response to receiving a query as to whether the packet event has been detected and tracked by the logical forwarding element for a second packet,
   determining a second packet signature of the second packet; and
   based on the second packet signature, applying the set membership filter to determine whether the second packet is a possible member of the set associated with the packet event.

2. The method of claim 1, wherein updating the set membership filter comprises:
   applying k hash functions on the first packet signature to map the first packet signature onto k elements of an array with m elements of the set membership filter.

3. The method of claim 2, wherein applying the set membership filter comprises:
   applying the k hash functions on the second packet signature to map the second packet signature onto k elements of the array with m elements; and
   based on the k elements, determining whether the second packet is a possible member of the set of associated with the packet event.

4. The method of claim 1, wherein the method further comprises:
   in response to determination that the second packet is a possible member of the set associated with the packet event, generating and sending a positive response to a management entity from which the query is received.

5. The method of claim 1, wherein detecting the packet event comprises:
   detecting a packet loss event, being the packet event, by dropping the first packet at the logical forwarding element.

6. The method of claim 1, wherein detecting the packet event comprises:
   detecting a performance-related event, being the packet event, by determining that a performance metric is associated with the first packet does not satisfy a predetermined threshold, wherein the performance metric includes one or more of the following: latency, throughput, packet size and jitter.

7. The method of claim 1, wherein determining the first packet signature comprises at least one of the following:
   extracting invariant content from the first packet by applying a mask on the first packet; and
   extracting, from the first packet, a set of tuples that includes one or more of the following: source address, source port number, destination address, destination port number and protocol.

8. A non-transitory computer-readable storage medium that includes a set of instructions which, in response to execution by a processor of a computer system, cause the processor to perform packet event tracking, wherein the method comprises
   in response to detecting, by a logical forwarding element supported by the computer system, a packet event for a first packet travelling between a source and a destination via the logical forwarding element,
      determining a first packet signature of the first packet; and
      tracking the packet event by updating a set membership filter based on the first packet signature to indicate that the first packet is a member of a set associated with the packet event; and
   in response to receiving a query as to whether the packet event has been detected and tracked by the logical forwarding element for a second packet,
      determining a second packet signature of the second packet; and
      based on the second packet signature, applying the set membership filter to determine whether the second packet is a possible member of the set associated with the packet event.

9. The non-transitory computer-readable storage medium of claim 8, wherein updating the set membership filter comprises:
   applying k hash functions on the first packet signature to map the first packet signature onto k elements of an array with m elements of the set membership filter.

10. The non-transitory computer-readable storage medium of claim 9, wherein applying the set membership filter comprises:
   applying the k hash functions on the second packet signature to map the second packet signature onto k elements of the array with m elements; and
   based on the k elements, determining whether the second packet is a possible member of the set of associated with the packet event.

11. The non-transitory computer-readable storage medium of claim 8, wherein the method further comprises:
   in response to determination that the second packet is a possible member of the set associated with the packet event, generating and sending a positive response to a management entity from which the query is received.

12. The non-transitory computer-readable storage medium of claim 8, wherein detecting the packet event comprises:
   detecting a packet loss event, being the packet event, by dropping the first packet at the logical forwarding element.

13. The non-transitory computer-readable storage medium of claim 8, wherein detecting the packet event comprises:
   detecting a performance-related event, being the packet event, by determining that a performance metric is associated with the first packet does not satisfy a predetermined threshold, wherein the performance metric includes one or more of the following: latency, throughput, packet size and jitter.

14. The non-transitory computer-readable storage medium of claim 8, wherein determining the first packet signature comprises at least one of the following:
   extracting invariant content from the first packet by applying a mask on the first packet; and
   extracting, from the first packet, a set of tuples that includes one or more of the following: source address, source port number, destination address, destination port number and protocol.

15. A computer system configured to perform packet event tracking, wherein the computer system comprises:
   a processor; and
   a non-transitory computer-readable medium having stored thereon instructions that, when executed by the processor, cause the processor to perform the following:
   in response to detecting, by a logical forwarding element supported by the computer system, a packet event for a first packet travelling between a source and a destination via the logical forwarding element,
      determine a first packet signature of the first packet; and
      track the packet event by updating a set membership filter based on the first packet signature to indicate that the first packet is a member of a set associated with the packet event; and
   in response to receiving a query as to whether the packet event has been detected and tracked by the logical forwarding element for a second packet,
      determine a second packet signature of the second packet; and
      based on the second packet signature, apply the set membership filter to determine whether the second packet is a possible member of the set associated with the packet event.

16. The computer system of claim 15, wherein the instructions for updating the set membership filter cause the processor to:
   apply k hash functions on the first packet signature to map the first packet signature onto k elements of an array with m elements of the set membership filter.

17. The computer system of claim 16, wherein the instructions for applying the set membership filter cause the processor to:
   apply the k hash functions on the second packet signature to map the second packet signature onto k elements of the array with m elements; and
   based on the k elements, determine whether the second packet is a possible member of the set of associated with the packet event.

18. The computer system of claim 15, wherein the instructions further cause the processor to:

in response to determination that the second packet is a possible member of the set associated with the packet event, generate and send a positive response to a management entity from which the query is received.

19. The computer system of claim 15, wherein the instructions for detecting the packet event cause the processor to:
   detect a packet loss event, being the packet event, by dropping the first packet at the logical forwarding element.

20. The computer system of claim 15, wherein the instructions for detecting the packet event cause the processor to:
   detect a performance-related event, being the packet event, by determining that a performance metric is associated with the first packet does not satisfy a predetermined threshold, wherein the performance metric includes one or more of the following: latency, throughput, packet size and jitter.

21. The computer system of claim 15, wherein the instructions for determining the first packet signature cause the processor to perform at least one of the following:
   extract invariant content from the first packet by applying a mask on the first packet; and
   extract, from the first packet, a set of tuples that includes one or more of the following: source address, source port number, destination address, destination port number and protocol.

* * * * *